United States Patent
Ferguson et al.

(10) Patent No.: US 10,690,415 B2
(45) Date of Patent: Jun. 23, 2020

(54) SPLIT ROOF FOR A METALLURGICAL FURNACE

(71) Applicant: Systems Spray-Cooled, Inc, Smyrna, TN (US)

(72) Inventors: Scott A. Ferguson, Murfreesboro, TN (US); Marina K. Temkina, Nashville, TN (US); Troy D. Ward, Franklin, TN (US); Logan Wilson, Smyrna, TN (US)

(73) Assignee: Systems Spray-Cooled, Inc., Smyrna, TN (US)

( * ) Notice: Subject to any disclaimer, the term of this patent is extended or adjusted under 35 U.S.C. 154(b) by 492 days.

(21) Appl. No.: 15/692,989

(22) Filed: Aug. 31, 2017

(65) Prior Publication Data

US 2019/0063840 A1 Feb. 28, 2019

(51) Int. Cl.
| | |
|---|---|
| F27D 1/18 | (2006.01) |
| F27D 11/08 | (2006.01) |
| H05B 7/20 | (2006.01) |
| F27D 3/14 | (2006.01) |
| F27D 9/00 | (2006.01) |

(52) U.S. Cl.
CPC .............. *F27D 1/1816* (2013.01); *F27D 3/14* (2013.01); *F27D 11/08* (2013.01); *H05B 7/20* (2013.01); *F27D 2009/0016* (2013.01); *F27D 2009/0064* (2013.01); *F27D 2201/00* (2013.01)

(58) Field of Classification Search
CPC ................... F27D 11/08; F27D 1/1816; F27D 2009/0016; F27D 2009/0064; F27D 2201/00; F27D 3/14; H05B 7/20

USPC ........ 373/71, 73, 74, 76; 266/241, 193, 194, 266/287, 249, 262, 199, 280, 283, 286, 266/275; 432/250, 237, 238; 110/331, 110/332, 333, 334, 335
See application file for complete search history.

(56) References Cited

U.S. PATENT DOCUMENTS

| | | | | |
|---|---|---|---|---|
| 3,081,074 | A | * | 3/1963 | Blackman .............. C21D 9/673 432/260 |
| 3,404,209 | A | * | 10/1968 | Wharton .................... F27B 3/08 373/73 |
| 3,429,973 | A | * | 2/1969 | Martinson ............. F27D 1/1816 373/74 |
| 4,423,857 | A | * | 1/1984 | Muzak .................. C21D 9/673 266/249 |
| 4,638,492 | A | | 1/1987 | Kerr |
| 4,715,042 | A | | 12/1987 | Heggart et al. |
| 4,813,055 | A | | 3/1989 | Heggart et al. |
| 4,815,096 | A | | 3/1989 | Burwell |

(Continued)

OTHER PUBLICATIONS

International Search Report and Written Opinion for PCT/US2018/032132 dated Oct. 30, 2018.

*Primary Examiner* — Dana Ross
*Assistant Examiner* — Ket D Dang
(74) *Attorney, Agent, or Firm* — Patterson + Sheridan, LLP

(57) ABSTRACT

An apparatus is disclosed for a split spray-cooled roof for a tilting metallurgical furnace. The split spray-cooled roof has a center, a first hollow metal roof section and a second hollow metal roof section. The first and second hollow roof sections are attached together along a prescription split line. The prescription split line having a first split line and a second split line, wherein the first split line is not aligned with the second split line and wherein the first and second split line are not aligned with the center.

19 Claims, 6 Drawing Sheets

(56) References Cited

U.S. PATENT DOCUMENTS

| | | | |
|---|---|---|---|
| 4,849,987 A * | 7/1989 | Miner, Jr. | F27D 1/1816 |
| | | | 373/74 |
| 5,115,184 A | 5/1992 | Arthur et al. | |
| 5,327,453 A | 7/1994 | Arthur et al. | |
| 5,330,161 A | 7/1994 | Lehr et al. | |
| 5,444,734 A | 8/1995 | Arthur et al. | |
| 5,561,685 A | 10/1996 | Lehr et al. | |
| 5,648,981 A | 7/1997 | Miner, Jr. et al. | |
| 5,887,017 A | 3/1999 | Arthur et al. | |
| 5,999,558 A * | 12/1999 | Miner, Jr. | F27D 1/1816 |
| | | | 373/73 |
| 6,092,742 A | 7/2000 | Miner, Jr. et al. | |
| 6,185,242 B1 | 2/2001 | Arthur et al. | |
| 6,274,081 B1 | 8/2001 | Fuchs | |
| 6,870,873 B2 | 3/2005 | Lyons et al. | |
| 7,452,499 B2 | 11/2008 | Arthur et al. | |
| 7,625,517 B2 | 12/2009 | Arthur et al. | |
| 2008/0128962 A1 | 6/2008 | Arthur et al. | |

* cited by examiner

SPLIT ROOF FOR A METALLURGICAL FURNACE

BACKGROUND OF THE DISCLOSURE

Field of the Disclosure

Embodiments of the present disclosure relates generally to a spray-cooled roof for a metallurgical furnace, particularly an electric arc furnace that heats charged metal by means of an electric arc via a graphite electrode.

Description of the Related Art

Metallurgical furnaces (e.g., an electric arc furnace or a ladle metallurgical furnace) are used in the processing of molten metal materials. The electric arc furnace heats charged metal in the furnace by means of an electric arc from a graphite electrode. The electric current from the electrode passes through the charged metal material forming a molten bath of the metal materials. The furnaces house the molten materials during the processing of the molten materials forming molten steel and slag (a stony waste material).

A metallurgical furnace has a number of components, including a roof that is retractable, a hearth that is lined with refractory brick, and a sidewall that sits on top of the hearth. The metallurgical furnace typically rests on a tilting platform to enable the furnace to tilt about an axis. During the processing of molten materials, the furnace tilts in a first direction to remove slag through a first opening in the furnace referred to as the slag door. Tilting the furnace in the first direction is commonly referred to as "tilting to slag." The furnace must also tilt in a second direction during the processing of molten materials to remove liquid steel via a tap spout. Tilting the furnace in the second direction is commonly referred to as "tilting to tap." The second direction is generally in a direction substantially opposite the first direction.

Because of the extreme heat loads generated during the processing of molten materials within the metallurgical furnace, various types of cooling methods are used to regulate the temperature of, for example, the roof and sidewall of the furnace. One cooling method, referred to as non-pressurized spray-cooling, sprays a fluid-based coolant (e.g., water) against an external surface of plate. The plate may be a part of a roof of the furnace or a part of a sidewall of the furnace. For this cooling method, the fluid-based coolant is sprayed from a fluid distribution outlet at atmospheric pressure. As the fluid-based coolant contacts the external surface of the plate, the plate is relieved of heat transferred to the plate from the molten materials within the furnace, thus regulating the temperature of the plate. An evacuation system is used to continually remove spent coolant (i.e., coolant that has contacted the external surface of the plate) from the plate.

The intense heat and harsh environment, along with the complex cooling and draining system for the roof of the furnace, require periodic maintenance and refurbishment of the roof for the electric arc furnace. The roof is so designed to be removable for such operations. However, the size and complexity of the spray-cooled roof makes it difficult and expensive when it is time to remove, repair and replace the spray-cooled roof. The spray-cooled roof typically requires special accommodations and equipment for moving and shipping. The cost of these accommodations and equipment coupled with the assembly and disassembly time can become expensive. Costs related to moving or shipping the spray-cooled roof for maintenance are attributable to the costs associated with the assembly and disassembly of the spray-cooled roofs due to the large size and complexity of the spray-cooled roof.

Therefore, there is a need for an improved spray-cooled roof.

SUMMARY

A split spray-cooled roof for a tilting metallurgical furnace is described herein. The split spray-cooled roof has a first hollow metal roof section and a second hollow metal roof section. The first and second hollow roof sections mating along a prescription split line and bounding at least a portion of a central opening of the roof. An interconnecting cross-over drain is coupled to the first and second hollow roof sections. The interconnecting cross-over drains allow gravitational fluid passage from an enclosed space of one of the hollow metal roof sections to an enclosed space in the adjacent hollow metal roof section when the roof is tilted.

In another example, a split spray-cooled roof for a tilting metallurgical furnace is described herein. The split spray-cooled roof has a center, a first hollow metal roof section and a second hollow metal roof section. The first and second hollow roof sections are attached together along a prescription split line. The prescription split line has a first split line and a second split line, wherein the first split line is not aligned with the second split line, and wherein the first and second split lines are not radially aligned with the center.

BRIEF DESCRIPTION OF THE DRAWINGS

So that the way the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
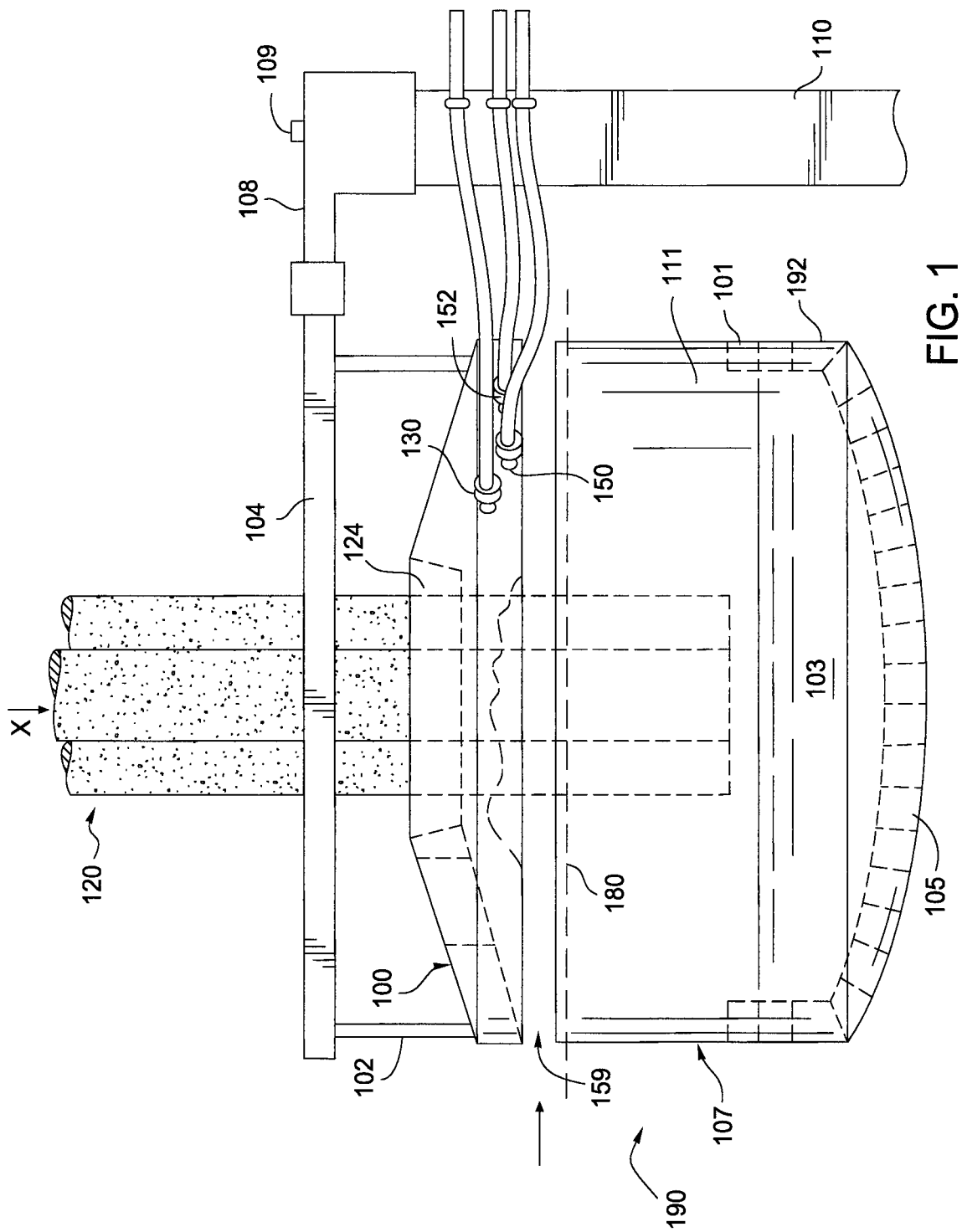
FIG. 1 illustrates an elevational side view of a metallurgical furnace having a spray-cooled roof.

The present invention is directed to a metallurgical electric arc furnace having a split spray-cooled roof comprising at least two, separate hollow metal roof sections detachably interconnected to be separately removable, shipped and installed together. A spray cooling system is employed within each of the hollow metal roof sections to prevent overheating of the roof's inner metal base member.

Some embodiments include interconnecting cross-over drains that provide a gravity fed fluid passage from an enclosed space of one hollow metal roof sections to another when the roof is tilted. The cross-over drains advantageously make certain that spent cooling fluid is directed to a drain of the roof even when the roof is tilted.

In some embodiments, the first and second hollow roof sections are attached together along a prescription split line. The prescription split line has a first split line and a second split line, wherein the first split line is not aligned with the second split line, and wherein the first and second split lines are not radially aligned with the center. The non-radial alignment of the first and second split lines allows the disassembled roof to be smaller in size as separate pieces. Stated differently, the non-radial alignment of the first and second split lines results in the first and second hollow roof sections having a smaller geometrical size relative to a conventional roof of the same diameter. Thus, the non-radial alignment of the first and second split lines enable the roof to be more easily put into service at less expense, while also enabling larger diameter roofs to be installed in locations having access constraints that would have prevented conventional roofs, assembled by welding, from being utilized.

Other embodiments include both interconnecting cross-over drains and non-radial alignment of the first and second split lines. Generally, each hollow metal roof section is detachably interconnected to adjacent hollow metal roof sections. The interconnection permits close engagement of each hollow metal roof section with each adjacent hollow metal roof section via a bolted, pinned, or other suitable connection which allows for thermal expansion of the spray-cooled roof without compromising fluid tightness for the spray-cooled system. A radial split line chamfer is provided along a lowermost edge of the interconnection of the hollow metal roof sections to redistribute and reduce stresses in the thermally stressed areas of the spray-cooled roof. The outermost portions of the hollow metal roof sections define an outer, circular periphery of the roof which is supported by the underlying upper shell of the body of the metallurgical electric arc furnace. The hollow metal roof sections are arranged to be closely adjacent and define an inner opening which provides vertical access through the spray-cooled roof for at least one graphite electrode to pass therethrough into the metallurgical electric arc furnace there below. The coolant supply header conduit for each hollow metal roof section is detachably interconnected with a common source of coolant by way of an outboard coolant supply for the spray-cooled system. Coolant drain outlets are provided to receive spent coolant from inside each hollow metal roof section. Peripheral interconnected cross-over drains are detachable and provide drainage from one hollow metal roof section into an adjacent hollow metal roof section for maintaining operative evacuation of coolant from the split spray-cooled roof. A peripheral detachably interconnected extension connects disjointed evacuation drain sections from the hollow metal roof sections to form a continuous unitary circumferential drain channel. Peripheral interconnected cooling water supply headers for the spray cooling system are detachable and combine to form a unitary header for the coolant supply.

FIG. 1 illustrates an elevational side view of a metallurgical furnace 190 having a spray-cooled roof 100. The metallurgical furnace 190 has a body 192. The body 192 has a hearth 101 that is lined with refractory brick 105, and a sidewall 107 that sits on top of the hearth 101. The sidewall 107 has a top 159. The spray-cooled roof 100 is moveably disposed on the top 159 of the sidewall 107. The metallurgical furnace 190 has an interior volume 111. The interior volume 111 of the metallurgical furnace 190 enclosed by the spray-cooled roof 100 and the body 192. The interior volume 111 may be loaded or charged with material 103, e.g., metal, scrap metal, or other meltable material, which is to be melted within the metallurgical furnace 190.

The metallurgical furnace 190, including the body 192 and the spray-cooled roof 100, is rotatable along a tilt axis 180 about which the metallurgical furnace 190 can tilt. The metallurgical furnace 190 may be tilted in a first direction about the tilt axis 180 toward the slag door (not shown) multiple times during a single batch melting process, sometimes referred to as a "heat", to remove slag. Similarly, the metallurgical furnace 190 may be tilted in a second direction about the tilt axis 180 towards a tap spout (not shown) multiple times during a single batch melting process including one final time to remove the molten material 103.

Roof lift members 102 may be attached at a first end to the spray-cooled roof 100. The roof lift members 102 may by chains, cables, ridged supports, or other suitable mechanisms for supporting the spray-cooled roof 100. The roof lift members 102 may be attached at a second end to one or more mast arms 104. The mast arms 104 extend horizontally and spread outward from a mast support 108. The mast support 108 may be supported by a mast post 110. A coupling 109 may attach the mast post 110 to the mast support 108. The mast support 108 may rotate about the coupling 109 and the mast post 110. Alternately, the mast post 110 may rotate with the mast support 108 for moving the roof lift members 102. In yet other examples, roof lift members 102 may be aerially supported to move the spray-cooled roof 100. In one embodiment, the spray-cooled roof 100 is configured to swing or lift away from the sidewall 107. The spray-cooled roof 100 is lifted away from the sidewall 107 to expose the interior volume 111 of the metallurgical furnace 190 through a top 159 of the sidewall 107 for loading material therein.

Figure 2:
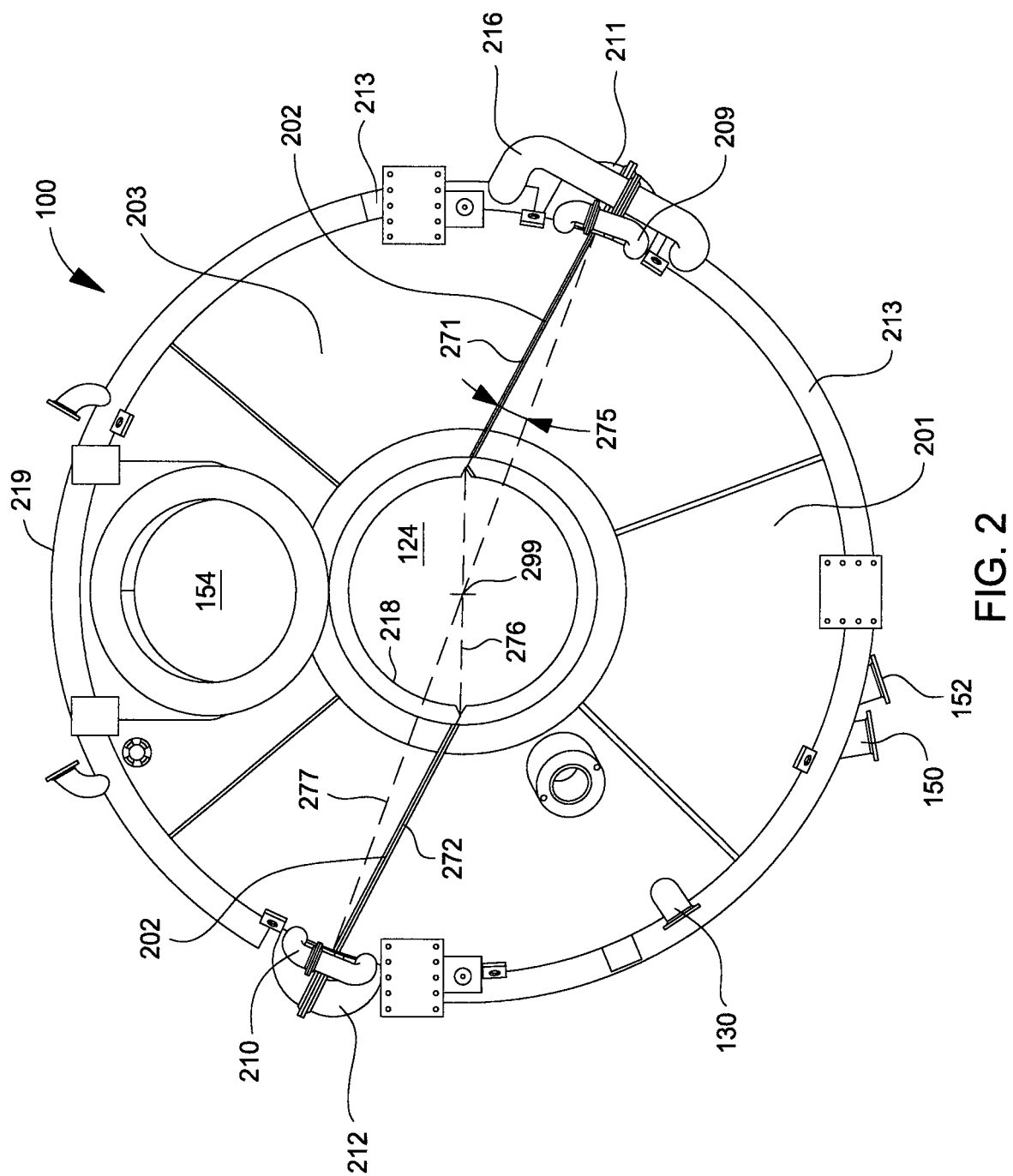
FIG. 2 illustrates a top plan view of the spray-cooled roof assembly of FIG. 1.

The spray-cooled roof 100 may be circular in shape when viewed from a top plan view, such as shown in FIG. 2. A central opening 124 may be formed through the spray-cooled roof 100. Electrodes 120 extend through the central opening 124 from a position above the spray-cooled roof 100 into the interior volume 111. During operation of the metallurgical furnace 190, the electrodes 120 are lowered through the central opening 124 into the interior volume 111 of the metallurgical furnace 190 to provide electric arc-generated heat to melt the material 103.

The spray-cooled roof 100 may further include an exhaust port to permit removal of fumes generated within the interior volume 111 of the metallurgical furnace 190 during operation.

FIG. 2 illustrates a top plan view of the spray-cooled roof 100 of FIG. 1. A prescription split line 202 separates the spray-cooled roof 100 into adjoining mating hollow metal roof sections. Although two hollow metal roof sections 203, 201 are illustrated in FIG. 2, the prescription split line(s) may be utilized to segment the spray-cooled roof 100 into any reasonable number of hollow metal roof sections. The spray-cooled roof 100 has an outer wall 219 and an inner wall 218. The inner wall 218 bounds the central opening 124 which is located concentric to a center (e.g., the centerline) 299 of the spray-cooled roof 100. The central opening 124 may separate the prescription split line 202 into a first split line 271 and a second split line 272. The spray-cooled roof 100 may have an upwardly sloping shape, for example a frustoconical or torispherical shape, and is disposed over the metallurgical furnace 190 to enclose the interior volume 111. Alternatively, the spray-cooled roof 100 may have other shapes.

The first split line 271 and the second split line 272 extend from the outer wall 219 to an inner wall 218. A first imaginary line 277 extending through an outer end of the first split line 271 and an outer end of the second split line 272 may traverse through the center 299. In the example of FIG. 2, the first imaginary line 277 extends through the center 299, but alternatively, the first imaginary line 277 may be offset from the center 299. Similarly, a second imaginary line 276 extending through an inner end of the first split line 271 and an inner end of the second split line 272 may traverse through the center 299. However, the first imaginary line 277 is not linearly aligned with the second imaginary line 276. Similarly, the first split line 271 is not aligned (i.e., is not collinear) with the second split line 272. In a first example, neither the first split line 271 nor the second split line 272 is radially aligned with the center 299. In a second example that may be in addition or alternative to the first example, the first split line 271 nor the second split line 272 is aligned with the first imaginary line 277. In a third example that may be in addition or alternative to the first example and/or the second example, neither the first split line 271 nor the second split line 272 is aligned with the second imaginary line 276. In the example illustrated in FIG. 2, the first and second split lines 271, 272 may be formed at an angle 275 to the first imaginary line 277. The hollow metal roof sections 203, 201 are connected to one another along the prescription split line 202. The hollow metal roof sections 203, 201 may be attached or detached from each other. Although, only two hollow metal roof sections 203, 201 are shown, the spray-cooled roof 100 may have a plurality of hollow metal roof sections, such as three or more. The separate hollow metal roof sections 203, 201 are attached to any adjacent separate hollow metal roof sections to form the spray-cooled roof 100. In this manner thermal expansion of the adjoining hollow metal roof sections 203, 201 does not stress the joints between the hollow metal roof sections 203, 201 or the connections for the coolant and drain system enabling the coolant and drain systems to remain free from leakage.

The mating hollow metal roof sections 201, 203 may be attached along the prescription split line 202 using fasteners, pins, welds, clamps or attached by any suitable joining technique. In one embodiment, the hollow metal roof sections 201, 203 are detachably interconnected with bolts in a manner such that the sections 201, 203 may be easily separated and reassembled together. Here, two detachably interconnected hollow metal roof sections 201, 203 are separated along the prescription split line 202. It should be appreciated that introducing additional hollow metal roof sections would introduce additional split lines. For example, a spray-cooled roof 100 formed from three hollow metal roof sections would have a first, second and third split line between each adjoining hollow metal roof sections.

The spray-cooled roof 100 has a spray cooling system 550 that is detailed further below with reference to FIGS. 4 and 5. Coolant supply 130 provides coolant to the spray cooling system 550 interfaced with the spray-cooled roof 100. The coolant, such as water or other suitable fluid, is provided internally to each hollow metal roof section 201, 203. Coolant supply connections 209 and 210 provide fluid connection between the coolant supply 130 and the spray cooling system 550 in each of the hollow metal roof sections 201, 203. The coolant is sprayed within the hollow metal roof sections 201, 203 of the split spray-cooled roof to maintain the inner metal base member of the spray-cooled roof below a maximum operating temperature.

The split spray-cooled roof includes detachable interconnecting cross-over drains that couple the hollow interiors (also referred to as "enclosed space") of the adjacent hollow metal roof sections across the prescription split line 202. For example, as shown in FIGS. 2 and 5, interconnecting cross-over drains 211, 212 provide a fluid passage between the hollow interior of the hollow metal roof sections 201 and the hollow interior of the hollow metal roof sections 203. The peripheral detachably interconnecting cross-over drains 211, 212 are connected to the hollow metal roof sections 201, 203 at the lowermost portion of hollow metal roof sections 201, 203 so that adjacent sections of the spray-cooled roof 100 to realize complete evacuation of spent cooling water from the hollow interior of one roof section to the hollow interior of the adjacent roof section. In one embodiment, a portion of each interconnecting cross-over drains 211, 212 may be coupled to each hollow metal roof section 201, 203, with the portion of the drains 211, 212 fastened together to form the passages between the hollow interiors. In other embodiments, the interconnecting cross-over drains 211, 212 may be single or multiple pipes having ends coupled to each of the hollow metal roof section 201, 203 to form the passages between the hollow interiors. Beneficially, the interconnecting cross-over drains 211, 212 provide a gravity fed fluid passage from the enclosed hollow interior of one hollow metal roof section to the enclosed hollow interior of the adjacent hollow metal roof section, even when the roof is tilted from horizontal during tilting to slag and tilting to tap operations. The cross-over drains advantageously make certain that spent cooling fluid within the hollow interiors is directed to a drain of the roof even when the roof is tilted.

An external evacuation drain 213 is provided along the outer wall 219 of each hollow metal roof section 201, 203. A peripheral detachably interconnected extension 216 connects the evacuation drain 213 along each hollow metal roof section 201, 203 to form a continuous unitary circumferential drain to dedicated outlets 150, 152 exiting the one of the hollow metal roof section, such as section 203. In one embodiment, a portion of each interconnected extension 216 may be coupled to each portion of the evacuation drain 213 associated with one of hollow metal roof sections 201, 203, with the portion of the interconnected extension 216 fastened together to form the passages between each portion of the evacuation drain 213. In other embodiments, the interconnected extension 216 may be formed from single or multiple pipes having ends coupled to each portion of the disjointed evacuation drain 213.

Figure 3:
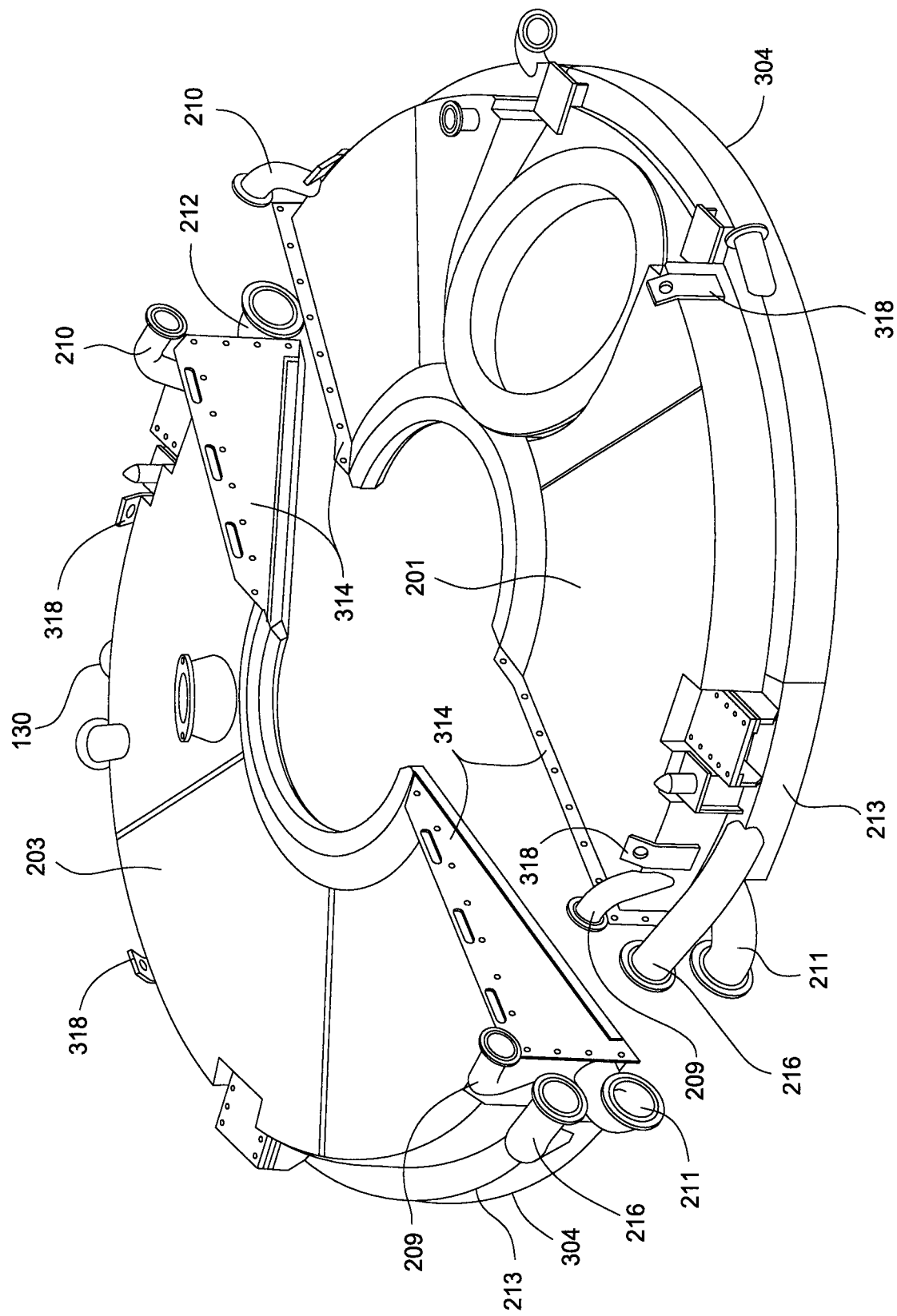
FIG. 3 illustrates an exploded orthogonal view showing two hollow metal roof sections of the spray-cooled roof assembly of FIG. 1.

FIG. 3 illustrates an exploded orthogonal view showing two hollow metal roof sections 203, 201 of the spray-cooled roof 100 of FIG. 1. FIG. 4 illustrates a cross-section detail of a connection engaging adjacent hollow metal roof sections 203, 201 of the spray-cooled roof 100 along the prescription split line 202 shown in FIG. 3. FIG. 5 illustrates an orthogonal view for one of the hollow metal roof sections 203 of FIG. 3. Simultaneously referring to FIGS. 3 and 5, each of the hollow metal roof sections 203, 201 are provided with a downwardly opening metal support member 304 which seats with the circular peripheral top 159 of the underlying body 192 of the metallurgical furnace 190.

The interconnecting cross-over drains 211, 212 and the conventional spray-cooled internal or external evacuation drain 213 too are shown detached in the elevational view. The peripheral detachably interconnected extension 216 connects disjointed evacuation drain 213 to form a continuous unitary circumferential drain coupled to dedicated outlets 150, 152 exiting from the hollow metal roof section 203. A parting wall 314 separating the detachably interconnected roof sections serves to isolate one roof section from the other so that interconnectivity can be maintained with a fastening connection 405 along the prescription split line 202 discussed further below with respect to FIG. 4 without leakage of spent fluid from within the interior of the hollow roof sections. Once the hollow metal roof sections 201, 203 are mated together along the prescription split line 202, the parting walls 314, drains 211, 212, 213, coolant supply connections 209, 210 and interconnected extension 216 all may be assembled together for forming the spray-cooled roof 100.

Figure 4:
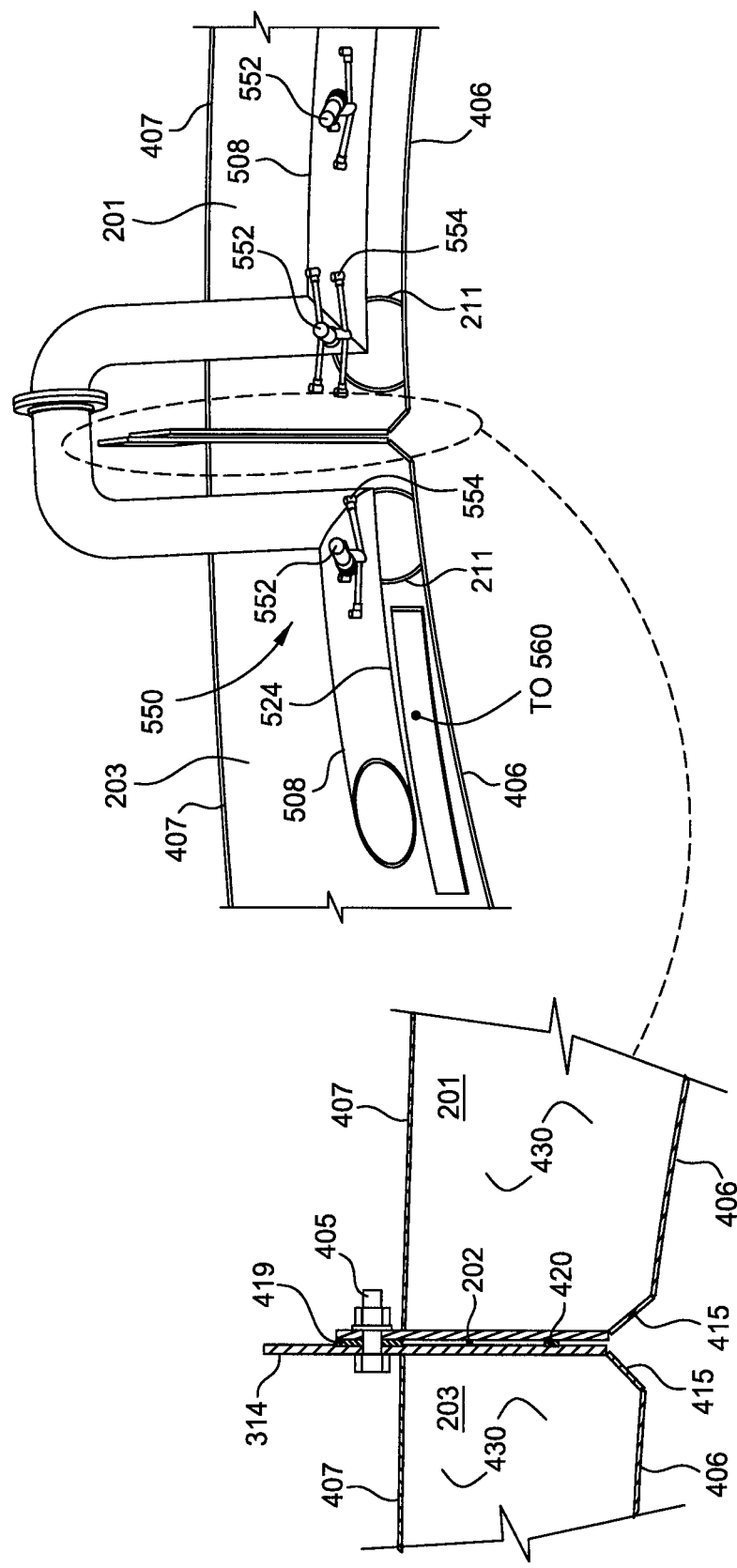
FIG. 4 illustrates a cross-section detail for a connection engaging adjacent hollow metal roof sections of the spray-cooled roof shown in FIG. 3

Turning now to FIG. 4, each hollow metal roof section 201, 203 is provided with connections 405 across the parting walls 314. In one embodiment, the connections 405 utilize bolts and nuts to securely hold the hollow metal roof sections 203, 201 together. Two hollow metal roof sections 203, 201 have an inner metal base member 406 and outer metal covering member 407. Each hollow metal roof section 201, 203 removably engages with the adjacent hollow metal roof section along the parting walls 314. An enclosed space 430 (also referred to as "hollow interior") is defined within each hollow metal roof section 201, 203 between an outer metal covering member 407, an inner metal base member 406 and the parting wall 314. The inner metal base member 406 is a plate having an external surface directly facing the interior volume 111 of the metallurgical furnace 190 in which the material 103 is processed. A radial split line chamfer 415 is provided along a lowermost edge of the inner metal base member 406. The radial split line chamfer 415 redistributes and reduces thermal stress in the area where the two hollow metal roof sections 203, 201 are joined. Additionally, spacers 419 and 420 may be utilized to separate the detachably interconnected hollow metal roof sections 203, 201 to allow for thermal expansion and lessening of associated expansion and contraction stresses.

Figure 5:
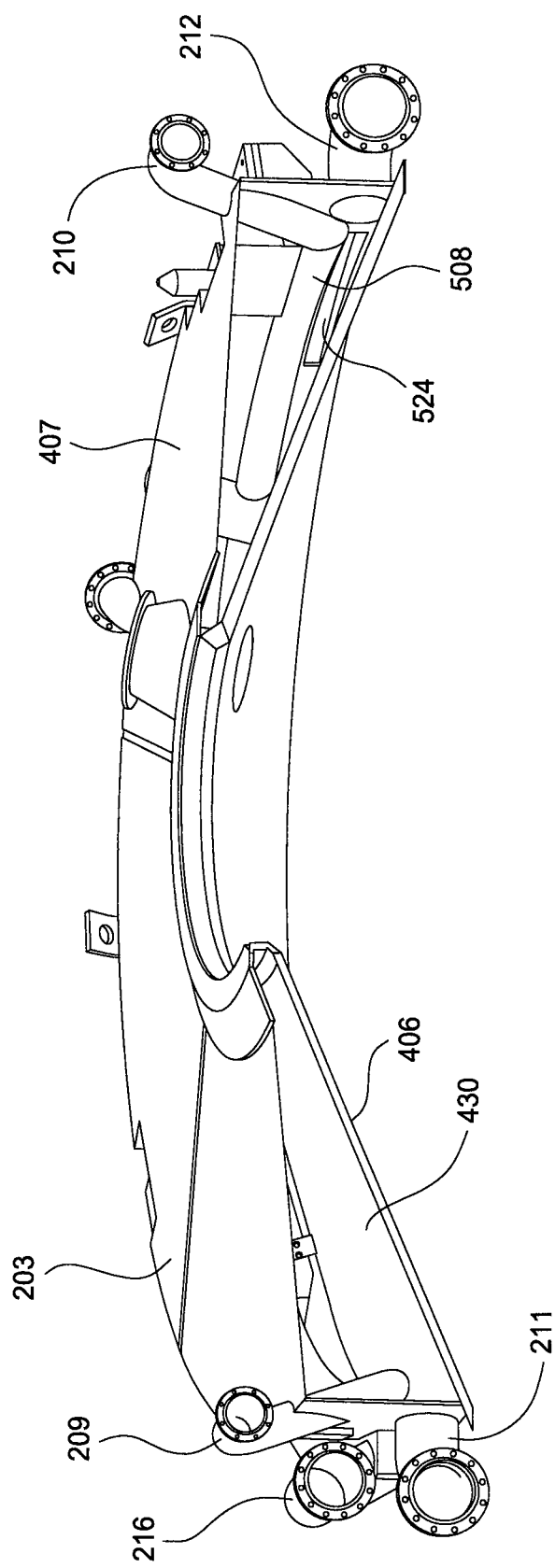
FIG. 5 illustrates an orthogonal view for one of the hollow metal roof sections of FIG. 3.

Referring now to FIG. 5, the hollow metal roof section 203 is shown with the parting wall 314 removed. The hollow metal roof section 201 is similarly constructed. The hollow metal roof section 203 comprises an upwardly sloping inner metal base member 406 shaped to form a predetermined portion of the spray-cooled roof 100. The outer metal covering member 407 may additionally be shaped to form a predetermined portion of the spray-cooled roof 100. The outer metal covering member 407 is spaced from and opposite and quasi-parallel to the inner metal base member 406.

A liquid coolant supply header conduit 508 of the spray cooling system 550 affixed at an entrance to the hollow metal roof section 203 and extending around the inner metal base member 406 is provided. Peripheral detachably interconnecting coolant supply connections 209, 210 nearer the top of hollow metal roof section 203 communicate with the liquid coolant supply header conduits 508 disposed in adjoining hollow metal roof sections 201, 203 so that the cooling system 550 of the entire roof 100 may be supplied coolant from a single supply source. A liquid coolant supply conduit (not shown) for supplying liquid directly to each removable hollow metal roof section 201, 203 from a liquid coolant supply source is located outboard of the spray-cooled roof 100 and is connected to the liquid coolant supply header conduit 508.

The spray cooling system 550 is utilized to prevent excessive heat buildup in the inner metal base member 406 of the spray-cooled roof 100. As mentioned above, the spray cooling system 550 is attached to the coolant supply header conduit 508. The spray cooling system 550 is disposed in the enclosed space 430 of each hollow metal roof section 203. The spray cooling system 550 utilizes a fluid based coolant, such as water or some other suitable liquid. The coolant supply header conduit 508 is attached to a coolant supply system, such as coolant supply connections 209, 210. The spray cooling system 550 maintains a temperature profile for the hollow metal roof section 203 by spraying coolant onto the upwardly sloping inner metal base member 406 exposed to the interior volume 111 of the metallurgical furnace 190. The coolant is sprayed inside the enclosed space 430 to maintain the temperature of the inner metal base member of the spray-cooled roof 100 at a desirable level.

In the embodiment illustrated in FIG. 4, the spray cooling system 550 includes the liquid coolant supply header conduit 508, plurality of branch conduits 552 and fluid distribution outlets 554. The plurality of branch conduits 552 are fluidly coupled to the supply header conduit 508 and extend therefrom within the enclosed space 430. The fluid distribution outlets 554 are disposed on the distal ends of each branch conduit 552 within the enclosed space 430. Coolant flows into the liquid coolant supply header conduit 508, through the branch conduits 552, out the fluid distribution outlets 554, into the enclosed space 430, and onto the upwardly sloping inner metal base member 406 for cooling the hollow metal roof section 203.

An evacuation system 560 collects and removes the sprayed (i.e., spent) coolant from the enclosed space 430 of the hollow metal roof section 203. The evacuation system 560 has one or more outer liquid drain openings 524 located at the lowermost portion of the enclosed space 430. The outer liquid drain openings 524 collect the coolant sprayed in the enclosed space 430 by the spray cooling system 550 and empties into the evacuation drain 213 for removal, passing though the interconnecting cross-over drains 211, 212 as need in response to the spray-cooled roof 100 being tilted from horizontal. Additionally, as shown in FIGS. 2 and 5, the location of the cross-over drains 211, 212 is immediately proximate the parting walls 314. The location of the cross-over drains 211, 212 immediately proximate the parting walls 314 allows spent coolant flowing against the parting walls 314 when the spray cooled roof 100 is in a tilted orientation to be routed directly into the cross-over drains 211, 212 coupled to the higher of the hollow metal roof sections 201, 203, and through the cross-over drains 211, 212 into the lower of the hollow metal roof sections 201, 203, thus ensuring that the spent coolant will always be allowed to run by gravity to one of the outer liquid drain openings 524 so that the venturi pumps utilized to empty the external evacuation drain 213 will remain functioning to drain the spray-cooled roof 100 regardless of the tilt inclination of the spray-cooled roof 100.

Returning to FIG. 3, lifting lugs 318 are attached to each of the hollow metal roof sections 203, 201. The lifting lugs 318 provide attachment points for an overhead crane, lift or other device to remove and install the hollow metal roof sections 203, 201 from the spray-cooled roof 100. Additionally, the lifting lugs 318 serve to provide lift points for installing and removing the spray-cooled roof 100 from the metallurgical furnace 190. By way of example, one hollow metal roof section 203 is positioned adjacent a second hollow metal roof section 201 by the overhead crane or other device as shown in FIG. 3 and the overhead crane can be detached and removed. The remaining hollow metal roof sections, when more than two roof sections are utilized, are similarly attached to each other with fasteners. Thus, the hollow metal roof sections 201, 203 can be individually and separately removed, e.g., for inspection, maintenance, or replacement.

Figure 6:
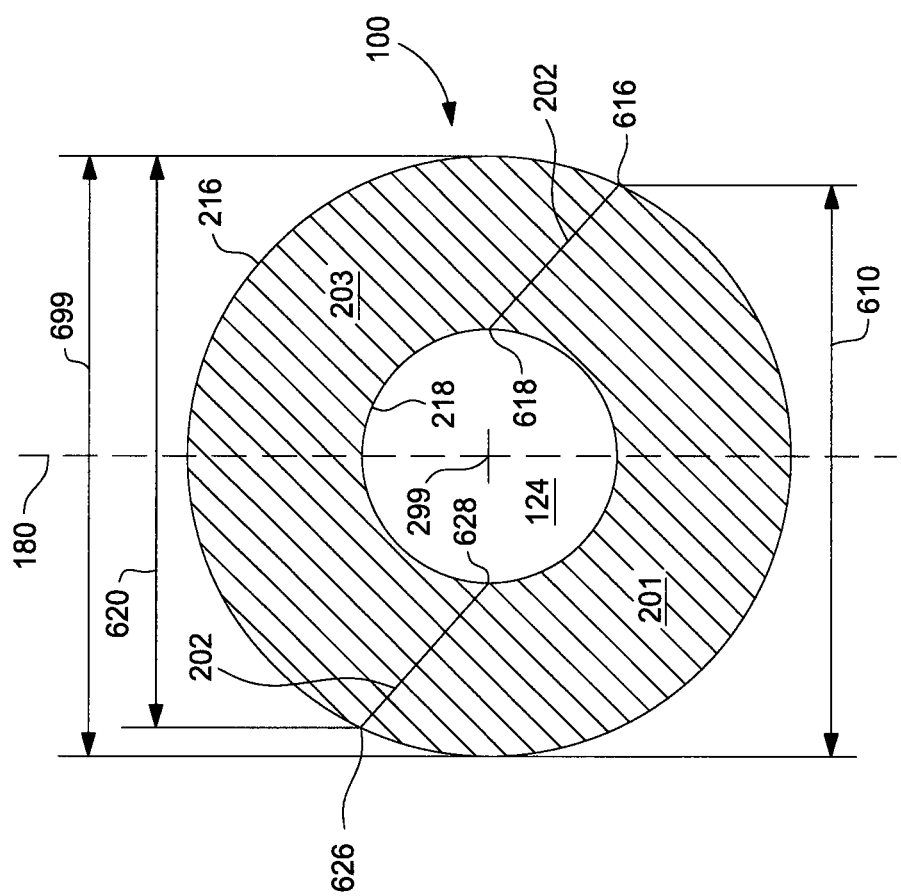
FIG. 6 illustrates the difference for the diameter length of the hollow metal roof sections compared to the diameter of the spray-cooled roof assembly.

Some additional advantages of the spray-cooled roof 100 are discussed in conjunction with FIG. 6. FIG. 6 illustrates the difference for a first length 610 of the hollow metal roof section 201 and a second length 620 of the hollow metal roof section 203 compared to a diameter 699 of the spray-cooled roof 100 achieved as a result of the misaligned split lines 271, 272 forming the prescription split line 202. The split line having two sections, not aligned and not passing radially through the center of the roof, has two roles. First, splitting the roof along the split line(s) enables shipping of two or more complete compatible roof sections requiring only mechanical assembly along the prescription split line. This permits assembly on or off furnace and replacement of a single section versus the whole roof. Shipping permits have typically required conventional spray-cooled roofs to be shipped in two sections which had to be welded together upon receipt. Assembly of the roof sections by welding is expensive and time consuming. The mechanical assembly saves multiple weeks of assembly time when assembling the parts without expensive time consuming welding. Maintenance can be performed on the whole roof while requiring handling of only half the size pieces of the roof during the on-site maintenance process. Without having to cut the roof apart to ship it out for maintenance, the split spray-cooled roof permits easy and quick removal of the assembly attachments for shipping the sections out for maintenance similar to how the spray-cooled roof sections were shipped in.

Second, the prescription split line, having two sections, not aligned and not passing radially through the center of the roof, intentionally avoids co-alignment with the tap-to-slag centerline. All of which are operationally busy locations around the roof circumference. The "prescribed" split line does not trap water anywhere in either of the roof sections when the furnace is tilted to tap or slag. The split line is prescribed to still be near to the roof centerline between tap and slag since spent cooling water logically collects there when the furnace is tilted. The coolant in the spray-cooled roof 100 is allowed to drain in each hollow metal roof section 201, 203 when the spray-cooled roof 100 is tilted with the metallurgical furnace 190 in either direction (left or right) along the tilt axis 180 for slag removal or metal pouring. A first midpoint 628 along the interior wall is substantially orthogonal to the tilt axis. A second midpoint 618 along the interior wall is substantially orthogonal to the tilt axis. Thus, tilting the spray-cooled roof 100 along the tilt axis 180 to the right will cause coolant within either hollow metal roof sections 201, 203 to flow by gravity to a drain on the outer wall 219 near a first endpoint 616. Similarly tilting the spray-cooled roof 100 along the tilt axis 180 to the left will cause coolant within either hollow metal roof sections 201, 203 to flow by gravity to a drain on the outer wall 219 near a second endpoint 626. Accordingly, coolant does not become entrapped near the inner wall 218 and can escape the area near the inner wall 218 by gravity. Thus, the location of prescription split line 202 provides for better gravity feed coolant drainage in the spray-cooled roof 100 when the metallurgical furnace 190 is tilted.

Advantageously, the split design for the spray-cooled roof provides for easy break down and assembly of the hollow metal roof sections with minimal connections for the coolant system and drainage. The hollow metal roof sections are advantageously configured to provide gravity drainage when assembled into the spray-cooled roof regardless of the tilt position of the furnace. The split line between the assembled hollow metal roof sections permits thermal expansion of the spray-cooled roof to occur without compromising the integrity of the coolant system or creating undue stress on the spray-cooled roof itself. The breakdown of the spray-cooled roof into the hollow metal roof sections allow for easy transport and handling while minimizing assembly and disassembly time thus providing a more cost effective solution.

While the foregoing is directed to embodiments of the present disclosure, other and further embodiments may be devised without departing from the basic scope thereof, and the scope thereof is determined by the claims that follow.

What is claimed is:

1. A split spray-cooled roof for a metallurgical furnace, the split spray-cooled roof comprising:
    a first hollow metal roof section;
    a second hollow metal roof section mating with the first hollow metal roof section to bound at least a portion of a central opening of the roof; and
    wherein the first and second hollow roof sections are attached together along a prescription split line passing through the central opening, the prescription split line comprising:
        a first split line; and
        a second split line, wherein the first split line is not aligned with the second split line, and wherein the first and second split line are not radially aligned with a center.

2. The split spray-cooled roof of claim 1 wherein the first and second hollow metal roof sections comprise:
    an upwardly sloping inner metal base member forming a pre-determined portion of the roof;
    an outer metal covering member spaced from and in register with said inner metal base member; and
    an enclosed space defined between the inner metal base member and the metal covering member.

3. The split spray-cooled roof of claim 2 wherein the enclosed space comprises:
    a coolant supply header conduit attached to fluid outlets populated throughout;
    a lower most portion;
    at least one outer liquid drain opening being located at a lowermost portion of the enclosed space for spent coolant evacuation.

4. The split spray-cooled roof of claim 3 further comprising:
    an interconnecting cross-over drain fluidly coupling the enclosed space of the first metal roof section to the enclosed space of the adjacent second hollow metal roof section.

5. The split spray-cooled roof of claim 3 wherein the liquid coolant supply header conduit disposed in the enclosed space of the first metal roof section is connected to the enclosed space of the adjacent second hollow metal roof section though a connection exterior to the roof.

6. The split spray-cooled roof of claim 3 further comprising:
    a first portion of an evacuation drain coupled to the first hollow metal roof section;
    a second portion of the evacuation drain coupled to the second hollow metal roof section, and wherein the first and second portions are detachably coupled by an interconnected extension.

7. The split spray-cooled roof of claim 1 further comprising:
    a connector removably fastening each hollow metal segment with each adjacent hollow metal roof section.

8. The split spray-cooled roof of claim 7 further comprising:
spacers disposed between the second hollow metal roof sections.

9. The split spray-cooled roof of claim 1 further comprising:
spacers disposed between adjacent walls of the first and second hollow metal roof sections.

10. The split spray-cooled roof of claim 1 further comprising:
radial split line chamfers disposed along a lowermost edge of adjacent walls of the first and second hollow metal roof sections.

11. A split spray-cooled roof for a metallurgical furnace, the split spray-cooled roof comprising:
a first hollow metal roof section;
a second hollow metal roof section attached to the first hollow roof section along a prescription split line, wherein the prescription split line comprises: a first split line; and a second split line, wherein the first split line is not aligned with the second split line, and wherein the first and second split line are not radially aligned with a center of the central opening; and
a first interconnecting cross-over drain coupling to an enclosed space of the first hollow metal roof section to an enclosed space of the second hollow metal roof section in an orientation that allows gravitational fluid passage between the enclosed spaces in response to the roof being in a tilted orientation.

12. The split spray-cooled roof of claim 11 further comprising:
a spray cooling system having water distribution outlets disposed in the enclosed spaces of the first and second hollow roof sections.

13. The split spray-cooled roof of claim 11, wherein the first hollow metal roof section further comprises:
a first partition wall separating the first hollow metal roof section from the second hollow metal roof section, wherein one end of the first interconnecting cross-over drain is disposed adjacent the first partition wall.

14. The split spray-cooled roof of claim 13, wherein the second hollow metal roof section further comprises:
a second partition wall facing the first partition wall of the first hollow metal roof section, wherein another end of the interconnecting cross-over drain is disposed adjacent the second partition wall.

15. The split spray-cooled roof of claim 13, wherein the first hollow metal roof section further comprises:
a second partition wall separating the first hollow metal roof section from the second hollow metal roof section; and
a second interconnecting cross-over drain coupling to the enclosed space of the first hollow metal roof section to the enclosed space of the second hollow metal roof section in an orientation that allows gravitational fluid passage between the enclosed spaces.

16. The split spray-cooled roof of claim 13, wherein the first hollow metal roof section further comprises:
a radial split line chamfers along a lowermost edge of the first partition wall.

17. The split spray-cooled roof of claim 11 further comprising:
an evacuation drain disposed along an outer wall of each hollow metal roof section, the evacuation drain fluidly coupled to the enclosed spaces of the first and second hollow metal roof sections.

18. The split spray-cooled roof of claim 17, wherein a first portion of the evacuation drain is coupled to the first hollow metal roof section, and a second portion of the evacuation drain is coupled to the second hollow metal roof section, and wherein the first and second portions are detachably coupled by an interconnected extension.

19. The split spray-cooled roof of claim 18 further comprising:
one or more outer liquid drain openings fluidly coupling the first portion of the evacuation drain to the enclosed space of the first hollow metal roof section; and
one or more outer liquid drain openings fluidly coupling the second portion of the evacuation drain to the enclosed space of the second hollow metal roof section.

* * * * *